(12) United States Patent
Burgess et al.

(10) Patent No.: US 11,998,024 B2
(45) Date of Patent: Jun. 4, 2024

(54) PROCESS FOR FILLING A RECEPTACLE WITH FROZEN CONFECTION

(71) Applicant: Conopco, Inc., Englewood Cliffs, NJ (US)

(72) Inventors: Geoffrey Alec Burgess, Wellingborough (GB); Gianfelice Romano, Bedford (GB); Magdalena Trycholik-Kinavuidi, Rochdale (GB)

(73) Assignee: Conopco, Inc., Englewood Cliffs, NJ (US)

( * ) Notice: Subject to any disclaimer, the term of this patent is extended or adjusted under 35 U.S.C. 154(b) by 579 days.

(21) Appl. No.: 16/621,647

(22) PCT Filed: Jun. 18, 2018

(86) PCT No.: PCT/EP2018/066072
§ 371 (c)(1),
(2) Date: Dec. 11, 2019

(87) PCT Pub. No.: WO2018/229291
PCT Pub. Date: Dec. 20, 2018

(65) Prior Publication Data
US 2020/0187523 A1    Jun. 18, 2020

(30) Foreign Application Priority Data
Jun. 16, 2017 (EP) .................... 17176473

(51) Int. Cl.
*A23G 9/28*    (2006.01)
*A23G 9/32*    (2006.01)
*A23G 9/42*    (2006.01)

(52) U.S. Cl.
CPC ............... *A23G 9/28* (2013.01); *A23G 9/322* (2013.01); *A23G 9/42* (2013.01)

(58) Field of Classification Search
None
See application file for complete search history.

(56) References Cited

U.S. PATENT DOCUMENTS 2,689,537 A    9/1954  Peyton
3,041,802 A *  7/1962  Cummings ............... A23G 9/04
                                               229/87.08
(Continued)

FOREIGN PATENT DOCUMENTS

CN    102791142    11/2012
CN    103002751    3/2013
(Continued)

OTHER PUBLICATIONS

Machine translation of DE 3521612. Publication date: Sep. 11, 1986. pp. 1-4. (Year: 1986).*
(Continued)

*Primary Examiner* — Jenna A Watts
(74) *Attorney, Agent, or Firm* — Gerard J. McGowan, Jr.

(57) ABSTRACT

The invention relates to a process for the preparation of a frozen confection product comprising the steps of: a. rotating a receptacle about a substantially vertical axis and depositing a continuous stream of one or more frozen confections into the receptacle; b. depositing into the receptacle a batch of solid inclusions independently from the continuous stream of frozen confection of step a.; and c. cooling the product of step b. to −5° C. or lower; wherein, the duration of steps a. to b. is 2.0 seconds or less.

13 Claims, 3 Drawing Sheets

(56) References Cited

U.S. PATENT DOCUMENTS

| | | |
|---|---|---|
| 3,220,445 A | 11/1965 | Taisey |
| 3,267,971 A | 8/1966 | Mueller |
| 3,285,198 A | 11/1966 | Hornstein |
| 3,509,920 A | 5/1970 | Word |
| 3,777,504 A | 12/1973 | Marchi |
| 4,152,079 A | 5/1979 | Raitt |
| 4,645,093 A | 2/1987 | Jones |
| 4,793,279 A | 12/1988 | Grenier |
| 5,135,767 A | 4/1992 | Daouse |
| 5,996,652 A | 12/1999 | Schromm |
| 2003/0111130 A1 | 6/2003 | Dugdale et al. |
| 2003/0183090 A1 | 10/2003 | Binley et al. |
| 2006/0110515 A1 | 5/2006 | Waletzko et al. |
| 2010/0065148 A1 | 3/2010 | Williams |
| 2011/0297272 A1 | 8/2011 | Hammonds et al. |
| 2011/0310695 A1 | 12/2011 | Sus et al. |
| 2013/0045310 A1 | 2/2013 | Ricco et al. |
| 2013/0255828 A1 | 10/2013 | Mengibar Rivas |
| 2015/0056350 A1 | 2/2015 | Bartkowska et al. |
| 2017/0367371 A1 | 12/2017 | Lebleu et al. |

FOREIGN PATENT DOCUMENTS

| | | |
|---|---|---|
| CN | 104185424 | 12/2014 |
| CN | 106998739 | 8/2017 |
| DE | 3521612 | 11/1986 |
| EP | 1277411 | 1/2003 |
| EP | 1657159 | 8/2007 |
| EP | 1602579 | 7/2008 |
| EP | 1980153 | 10/2008 |
| EP | 1969949 | 9/2019 |
| FR | 2433362 | 3/1980 |
| JP | 10000058 | 1/1998 |
| WO | WO0043699 | 7/2000 |
| WO | WO2008119731 | 10/2008 |
| WO | WO2010101576 | 9/2010 |
| WO | WO2011086058 | 7/2011 |
| WO | WO2011153465 | 12/2011 |
| WO | WO2012080282 | 6/2012 |
| WO | WO2015110226 | 7/2015 |
| WO | WO2016096727 | 6/2016 |

OTHER PUBLICATIONS

Byron Talbott, "The Chocolate Spectrum". Available online as of Mar. 4, 2015 from http://www.byrontalbott.com/the-chocolate-spectrum/. p. 1-5. (Year: 2015).*
Written Opinion in PCTEP2018066072; dated May 23, 2019.
Search Report and Written Opinion in PCTEP2018066072; dated Aug. 14, 2018.
Search Report and Written Opinion in EP17176473; dated Dec. 18, 2017.
Search Report and Written Opinion in EP15190742; dated Dec. 3, 2015.
Shen Xiaolin et al., Ice cream and Processing Technology thereof, Dairy Processing Technology, Beijing: China Light Industry Press, published in Aug. 2015, p. 155.
English translation of Chinese Office Action for Application Serial No. 201880052846.6 dated May 13, 2023.

* cited by examiner

PROCESS FOR FILLING A RECEPTACLE WITH FROZEN CONFECTION

FIELD OF THE INVENTION

The present invention relates to a process for preparing a frozen confection product comprising the steps of depositing a frozen confection and solid inclusions into a receptacle in 2 seconds or less.

BACKGROUND OF THE INVENTION

In a frozen confection factory, filling heads or nozzles are employed to fill receptacles such as a molds, cones and tubs. The time available for such filling is very short, typically, for example, about 2 seconds or less.

There has been a trend in consumer preference for having discrete pieces, typically known as inclusions, present in ice cream frozen confections. The trend has been for the size of the inclusions to increase over time. Furthermore, the trend has been towards having discrete regions within a receptacle, such as regions of ice cream, sauce and inclusions. Thus, many frozen confections have become quite heterogeneous in their internal structure.

A known method of independently depositing solid inclusions into a receptacle is to pass the solid inclusions through a screw feeder. Such a screw feeder will be calibrated to deliver a certain quantity of solid inclusions over time during a continuous production process. However, passing large solid inclusions through a screw feeder tends to cause inconsistent dosing and damage to the inclusions, including misshaping.

Alternatively, to avoid damage to the inclusions as observed by use of the screw feeder, inclusions may be introduced into a frozen confection receptacle together with the frozen confection, such as ice cream, as a pre-mixed composition. The pre-mixed composition is prepared by dosing non-sticky inclusions of between 1 mm and 10 mm in particle size into a mixing chamber comprising a flowing (continuous) stream of ice cream. The ice cream-inclusion mix is then deposited into a receptacle. Such a process is typically used at the point of sale for single serve products, see for example US 2003/0183090 A1.

It has been found that such a pre-mixing process is more suitable for large scale industrial continuous processes, in particular, when inclusions of 10 mm or less in size are used. The use of the pre-mixing process for large scale processes enables the desired uniform distribution and quantity of inclusions per product. However, as the size of the inclusions increase, problems such as blockage of the mixing chamber and inconsistent quantity delivery (inconsistent dosing), have been observed. Furthermore, these problems appear to become more pronounced as the size and stickiness of the inclusions increases. Where 'stickiness' means the inclusions' ability to adhere to each other.

An additional problem that has been found with products prepared by both the mixing-chamber and screw thread process is that there is an increase in the variability of the amount of solid inclusions that are present in the final product. This is believed to be because the inclusions are so large that the number of inclusions per frozen confection product becomes quite small. The result of this is that a receptacle having a few more or a few less inclusions becomes very noticeable. This is of particular relevance for products prepared on a large industrial scale by a continuous process. Consistency in dosing becomes extremely important for product quality as variability in quality can lead to increased customer complaints and can damage brand reputation. Additionally, variability in dosing can lead to supply chain issues in terms of predictability of required ingredient quantities.

There is a need to provide a process suitable for industrial-scale manufacturing of frozen confection products that enables a specified inclusion distribution and accurate quantity of inclusions per product, where fewer are damaged. The inclusions may include those that may be prone to adhering to each other. Inconsistent products, due to an undesirable dosing of solid inclusions and/or damaged inclusions and/or undesired location of inclusions, result in frozen confection waste that is non-recyclable. An improved process that enables a more consistent quality of product results in a reduced amount of waste produced.

Thus, a manufacturing method which avoids these problems would be highly desirable.

SUMMARY OF THE INVENTION

In a first aspect, the invention relates to a process for the preparation of a frozen confection product comprising the steps of:
 a. Rotating a receptacle about a substantially vertical axis and depositing a continuous stream of frozen confection into the receptacle;
 b. Depositing into the receptacle a batch of solid inclusions independently from the continuous stream of frozen confection of step a.;
 c. Optionally sealing the receptacle;
 d. Cooling the product of step b. or c. to −5° C. or lower;
 e. Optionally storing the frozen confection product of steps d. at between −15 and −30° C.
wherein the duration of steps a. to b. is about 2.0 seconds or less.

Preferably, the invention relates to a process for the preparation of a frozen confection product comprising the steps of:
 a. Rotating a receptacle about a vertical axis and depositing a continuous stream of frozen confection into the receptacle;
 b. Depositing into the receptacle a batch of solid inclusions independently from the continuous stream of frozen confection of step a.;
 c. Optionally sealing the receptacle;
 d. Cooling the product of step b. or c. to −5° C. or lower;
 e. Optionally storing the frozen confection product of steps d. at between −15 and −30° C.
wherein steps a. and b. are simultaneous or partly simultaneous, the batch of solid inclusions is delivered as a particulate material, the duration of step b. is 2.0 seconds or less, the duration of steps a. and b. is 2.0 seconds or less, and the receptacle of step a. is rotated from 3 to 30 times.

Preferably, the invention relates to a continuous process for the preparation of a frozen confection product comprising the steps of:
 a. Rotating a receptacle about a vertical axis and depositing a continuous stream of frozen confection into the receptacle;
 b. Depositing into the receptacle a batch of solid inclusions independently from the continuous stream of frozen confection of step a.;
 c. Optionally sealing the receptacle;
 d. Cooling the product of step b. or c. to −5° C. or lower;
 e. Optionally storing the frozen confection product of steps d. at between −15 and −30° C.

f. Repeating steps a. to e. at a rate of 30 or more receptacles dosed per minute.

wherein steps a. and b. are simultaneous or partly simultaneous, the batch of solid inclusions is delivered as a particulate material, the duration of step b. is 2.0 seconds or less, the duration of steps a. and b. is 2.0 seconds or less, and the receptacle of step a. is rotated from 3 to 30 times.

The duration of steps a. to b. may be about 2.0 seconds or less, 2.0 seconds or less, 1.5 seconds or less, 1.2 seconds or less or 1.0 second or less. The duration of steps a. to b. is determined by the number of receptacles to be dosed per minute; i.e. 30 or more receptacles are dosed per minute, 40 or more receptacles are dosed per minute, 50 or more receptacles are dosed per minute, 60 or more receptacles are dosed per minute.

Dosing or depositing means filling the receptacle with frozen confection, solid inclusions and any additional edible items such as sauces.

Batch of inclusions means a specific amount of solid inclusions dosed into a receptacle; where the specified amount is defined by, for example, either weight or number of inclusions. A batch of inclusions may include one or more types of inclusions.

Thus the invention involves depositing the batch of inclusions directly into the receptacle at the point of filling. This avoids the need to blend or pre-mix the batch of inclusions with a continuous stream of frozen confection. Furthermore, as the process avoids the use of a screw feeder, there is significantly less damage caused to the individual inclusions, even if they are very fragile. Additionally, there is greater control over the addition of the batch of inclusions and so variability of the quantity deposited is reduced.

As the receptacle is rotating the chute is held at a particular location over the open-topped receptacle, the rotation of the receptacle ensures that the solid inclusions are distributed either uniformly throughout the frozen confection in the receptacle, or in a particular area of the frozen confection within the receptacle.

The batch of solid inclusions are delivered as a particulate material into the receptacle. The delivery of the batch is within about 2.0 seconds or less of steps a. and b., and may be simultaneous or over the duration of filling e.g. delivered over the duration of from 0 to about 2.0 seconds. The delivery of the batch is within 2.0 seconds or less of steps a. and b., and may be simultaneous or over the duration of filling e.g. delivered over the duration of from 0 to 2.0 seconds, of from 0.1 to 2.0 seconds. Dosing the inclusions may be simultaneous to the frozen confection, or partly simultaneous. Partly simultaneous means that the inclusions are added to the receptacle simultaneously to the frozen confection, but may not be for the full duration of about 2.0 seconds. Partly simultaneous means that the inclusions are added to the receptacle simultaneously to the frozen confection, but may not be for the full duration of 2.0 seconds or less.

Preferably the product is formed by depositing the frozen confection and the solid inclusions independently into the receptacle. The solid inclusions are deposited under gravity into the receptacle and there is essentially no pre-mixing of the deposited components prior to depositing into the receptacle. Thus, very little or no shear forces are experienced by the solid inclusions, and so very little or no breakages occur during addition.

A continuous stream of frozen confection means the constant provision of frozen confection into a receptacle over the duration of filling, i.e. up to about 2.0 seconds.

A continuous manufacturing process means the sequential preparation of frozen confection products.

The solid inclusions may be delivered to the receptacle by a conveyor belt and chute. The solid inclusions are deposited into the open top of the receptacle under gravity. As the receptacle is rotating the solid inclusions are deposited in specific locations above the receptacle and the result will be a radially dispersed delivery of solid inclusions.

The specific location is determined by the position of the chute in relation to the receptacle.

In a preferred embodiment, a predetermined quantity of solid inclusions is added to each receptacle. In a particularly preferred embodiment, a batch of solid inclusions is prepared of known weight and delivered to the receptacle.

The mean (average) weight of a batch of inclusions varies depending on the size and quantity of solid inclusions dosed into the receptacle in step c. In an embodiment of the present invention, 90% or greater of the frozen confection products prepared in a continuous process have a percentage deviation of weight from the mean weight of inclusions in a batch of frozen confection products from 0 to 10%, from 0 to 7.5%, from 0 to 5%, preferably from 0 to 3%, most preferably from 0 to 2%. Deviation means a percentage either greater or less than the mean weight of the inclusions of a batch of frozen confection products.

In a further embodiment of the present invention, 95% or greater of the frozen confection products prepared in a continuous process have a percentage deviation of weight from the mean weight of inclusions in a batch of frozen confection products from 0 to 10%, from 0 to 7.5%, from 0 to 5%, preferably from 0 to 3%, most preferably from 0 to 2%. Percentage deviation means a percentage either greater or less than the mean weight of the inclusions of a batch of frozen confection products.

For example, a known weight of solid inclusions may be provided e.g. by a multi-head weigher, which is capable of delivering a very accurate dose of solid particles onto a conveyor for deposition into the receptacle.

Typically, the mean (average) weight of a batch of inclusions is from 1 g to 50 g from 2 g to 40 g; from 3 g to 30 g; from 4 g to 20 g.

In a preferred embodiment at least some of the solid inclusions are deposited simultaneously with the frozen confection. Depositing one or more solid inclusions into the receptacle delivered independently from the continuous stream of frozen confection of step b.

Whilst steps a. and b. may occur simultaneously, the frozen confection and solid inclusions are deposited independently. Deposited independently means that the frozen confection and solid inclusions are delivered to the receptacle by separate means, for example, the frozen confection may be delivered via a nozzle, and the solid inclusions may be delivered via a chute.

The deposition of the solid inclusions can be varied to provide a variety of effects within the final product. For example, there may be a predominance of solid particles on the top surface of the frozen confection. Alternatively, there may be a predominance of solid particles on the bottom of the frozen confection. Alternatively, the solid inclusions could be distributed throughout the frozen confection. Additionally, a different effect can be achieved depending on whether the solid inclusions are added near to the side wall of the receptacle, between the centre and the receptacle wall and substantially at the centre.

Preferably the receptacle has a substantially vertical axis of rotation. Preferably the receptacle has a vertical axis of rotation. The location of the axis of rotation is preferably in the centre of the open top of the receptacle so that its rotation does not cause the location of the open top to correspondingly vary substantially.

The speed of rotation of the receptacle allows the distribution and gentle blending of the solid inclusions into the frozen confection during dosing. It is preferred that the rotation is sufficient to cause at least a few full rotations of the receptacle during the time it takes to fill it with frozen confection and solid inclusions. Therefore, preferably the receptacle makes from 3 to 30 rotations in the time taken to fill the receptacle, preferably from 5 to 20 rotations.

The frozen confectionery products that are produced by the process of the invention typically have a receptacle volume of from 50 to 1000 mL, preferably from 200 to 600 mL in size.

The receptacle will generally be inedible and formed from plastic or paper. Preferably the receptacle is a tub which can be sealed by placing a lid over the open top thereof. Optionally sealing the receptacle means closing or protecting the contents of the receptacle from the ambient atmosphere. The means for sealing or closing is typically a transparent flexible material that is attached to the receptacle after filling. Alternatively, a lid may be used, or both a transparent flexible materials and a lid may be used.

Typically, a frozen confection product, for example a frozen confection product of steps c. or d., will be stored at between −15 and −30° C.

In a second aspect, the invention relates to an apparatus for filling an open-topped receptacle with frozen confection and solid inclusions, the apparatus comprising a filling station (10), the filling station comprising a frozen confection dispenser (24), a solid inclusion dispenser (also referred to as a chute) (32), a receptacle rotator (40), the apparatus adapted to deposit frozen confection from the frozen confection dispenser (24) and solid inclusions from the solid inclusion dispenser (32) into a receptacle (16) that is being rotated by the receptacle rotator (40).

The apparatus may be capable of continuous or batch operation, however it is preferable that the operation of the apparatus is continuous; i.e. continuous filling of a sequence of similar receptacles, also known as a continuous production process.

The apparatus preferably comprises a receptacle delivery station (12) for delivering a sequence of receptacles to the receptacle rotator at the filling station.

Solid inclusions means one or more discrete pieces of an edible material, such as: chocolate or couverture (i.e. a chocolate analogue containing a fat other than cocoa butter); fruit; nuts; baked goods; cookie dough; toffee; fudge; caramel; nougat; marshmallow and popcorn. The fruit inclusion may be fresh, dried, frozen or sugar-infused. The baked goods may be selected form the group consisting of biscuit, cake, cookie, pastry and crumble.

The solid inclusions may also comprise discrete pieces of an edible material, where the edible material comprises two or more materials, for example, the solid inclusion may be an edible material centre with an edible material coating. The coating may be in the form of a solid shell, wherein the shell material is selected form the group consisting of chocolate, sugar and baked goods. The coating of the solid inclusion enables the material within the shell of the inclusion to be a liquid, gel or paste. Examples of such inclusions include peanut butter cup, soft filled chocolates (for example, chocolate with caramel centres), a pastry with a filling. An inclusion with a coating may be, for example, a chocolate coated nut, baked good, fruit, popcorn or caramel chunks, or a caramelized pecan.

Preferably the solid inclusions have an average hydraulic diameter of from 2 mm to 25 mm in size, more preferably from 5 mm to 23 mm in size, most preferably from 8 mm to 20 mm in size. Hydraulic diameter means the equivalent spherical diameter of a non-circular particle (object) in comparison with a circular particle (object).

"Solid inclusions" means one or more discrete pieces of edible material (also known as particles) behaving as a particulate material. Each piece is solid and is distinct from its neighbour, enabling the particles to flow. It should be noted that the solid inclusions may adhere to each other; however, any adhesion observed between the particles is greatly outweighed by gravitational forces allowing the solid particles to be treated as a pourable and handleable solid material. The solid inclusions may be deformable but do not coalesce with their neighbouring particles.

A batch of solid inclusions may comprise greater than one type of solid inclusion, for example, both cookie dough and crumble pieces.

Some solid inclusions may have solid properties at room temperature. However, some may require cooling in order for them to possess the required solid properties. For example, fruit pieces may be deposited in frozen form so that they possess the required solid properties. Some solid inclusions may require mild cooling, such as chocolate, in order to obtain the desired solid properties. Other solid inclusions such as biscuit pieces or marshmallow may not require cooling. The batch of solid inclusions present in step b. of the process may be cooled, frozen, chilled or at ambient room temperature.

The shape of the solid inclusions can take a variety of forms and can be regular or irregular. The solid particles may be elongate or have generally comparable linear dimensions. Preferably the solid particles have generally comparable linear dimensions, which includes spherical and cuboid type morphologies and can include shapes such as oblate or prolate, wherein the solid particles have an aspect ratio of 2:1 or less.

Frozen confection product means a receptacle comprising at least one frozen confection and one or more solid inclusions.

Frozen confection means a confection made by freezing a pasteurised mix of ingredients such as water, fat, sweetener, protein (normally milk proteins), and optionally other ingredients such as emulsifiers, stabilisers, colours and flavours. Frozen confections may be aerated. Frozen confection includes one or more of the group consisting of ice cream, frozen yoghurt, sorbet, frozen custard and mixtures thereof. Preferably the frozen confection is one or more ice creams.

The frozen confection of the present invention may be aerated. Preferably the frozen confection is aerated. The term "aerated" means that gas has been intentionally incorporated into the product, such as by mechanical means. The gas can be any food-grade gas such as air, nitrogen or carbon dioxide. The extent of aeration is typically defined in terms of "overrun" (OR). In the context of the present invention, % overrun is defined in volume terms (measured at atmospheric pressure) as:

$$OR = \frac{\text{volume of frozen aerated product} - \text{volume of premix at ambient temp}}{\text{volume of premix at ambient temp}} \times 100$$

The amount of overrun present in the product will vary depending on the desired product characteristics. In the context of the present invention the level of overrun of the frozen confection is typically from 0 to 150%, preferably from 10 to 100%, more preferably from 20 to 50%.

The process according to the invention may also include the addition of a liquid confection into the open top of the receptacle.

Suitable liquid confections include fat-based compositions such as chocolate or couverture (i.e. a chocolate analogue containing a fat other than cocoa butter); fruit purees/sauces; creams, cookie dough, biscuit pastes, honey, syrups, caramel, toffee, nougat or fudge sauces and the like. The liquid confection may be in the form of a fondant or a paste. The liquid confection may be aerated, for example a fruit or chocolate mousse. The liquid confection may also be a frozen confection which differs in some way (such as in formulation, texture, flavour or colouring) from the frozen confection material.

DETAILED DESCRIPTION OF THE INVENTION

The invention will now be illustrated, by way of example, with reference to the following figures in which.

Figure 1:
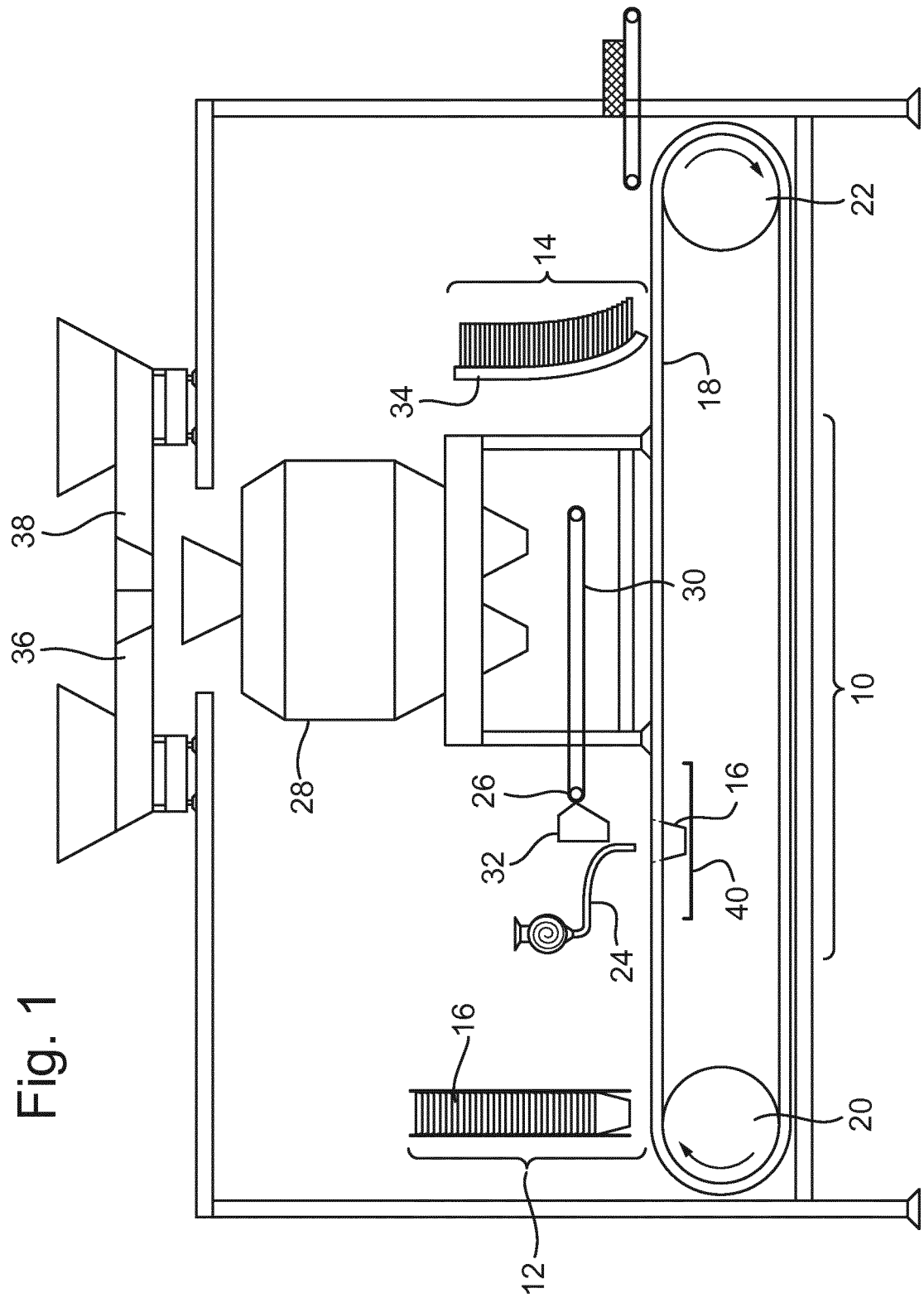
FIG. 1 is a schematic representation of an apparatus according to the invention for carrying out the process of the present invention.

In FIG. 1 is shown a filling station 10 with a receptacle delivery station 12 and a lid placement station 14.

Receptacle delivery station 12 comprises receptacles 16 are to be deposited onto a receptacle conveyor 18. The conveyor 18 is actuated by drive shafts 20, 22.

At the filling station 10 there is provided a frozen confection dispenser 24 which may comprise one, two, three or more frozen confection delivery channels, however only one such channel is shown in the figure.

Also present at the filling station 10 is a solid inclusion dispenser 26. The solid inclusion dispenser comprises a multi-head weigher 28, a dosing belt 30 and a chute 32. Multi-head weigher 28 is fed by two linear conveyors 36, 38.

The filling station 14 also comprises a receptacle rotator 40.

The lid placement station 14 comprises an automatic lid placement device 34.

In use, receptacles 16 are fed sequentially from receptacle delivery station 12 onto conveyor 18. Conveyor 18 is driven by drive shafts 20, 22 to take the receptacles 16 towards the filling station 10.

Once at the filling station the receptacle is placed on the receptacle rotator 40. Frozen confection is then dispensed into the open top of receptacle 16 from frozen confection dispenser 24. Multiple streams of frozen confection could be delivered, providing different varieties of frozen confection. The receptacle rotator 40 rotates the receptacle 16 whilst the frozen confection is being deposited into the receptacle 16. In this example the receptacle 16 rotates 7 times in the time taken to fill the receptacle with frozen confection and solid inclusions.

At the same time as the frozen confection is being deposited, solid inclusions are also deposited into the open top of the receptacle 16 from solid inclusion dispenser 26. Multi-head weigher 28 delivers a very accurate dose of solid inclusions onto dosing belt 30. The solid inclusions are then conveyed towards the receptacle 16 and are deposited under gravity through chute 32 and into the receptacle 16 as it is being rotated. As all of the solid inclusions deposited by the multi-head weigher 28 enter the receptacle 16 an accurate dosing of solid particulate material is ensured. Additionally, as the solid inclusions have not been exposed to any form of shear and only gently handled, there are very little, if any, breakages.

Once the receptacle 16 has been suitably filled it is then transferred to the lid placement station 14 by conveyor 18. Once at the lid placement station a lid is placed onto the receptacle and it exits the apparatus. The receptacle is then cooled. The receptacle is cooled in an apparatus such as a freezer with a typical temperature of about −18° C. The temperature may vary from between −30° C. and −10° C., depending on the type of apparatus and its environment; i.e. whether it is in an industrial, commercial or domestic environment. The receptacle and contents may be stored.

The process as described may be repeated in order to achieve a rate of from 20 to 80, a rate of from 30 to 60 receptacles per minute filled according to the process of the invention.

Figure 2A:
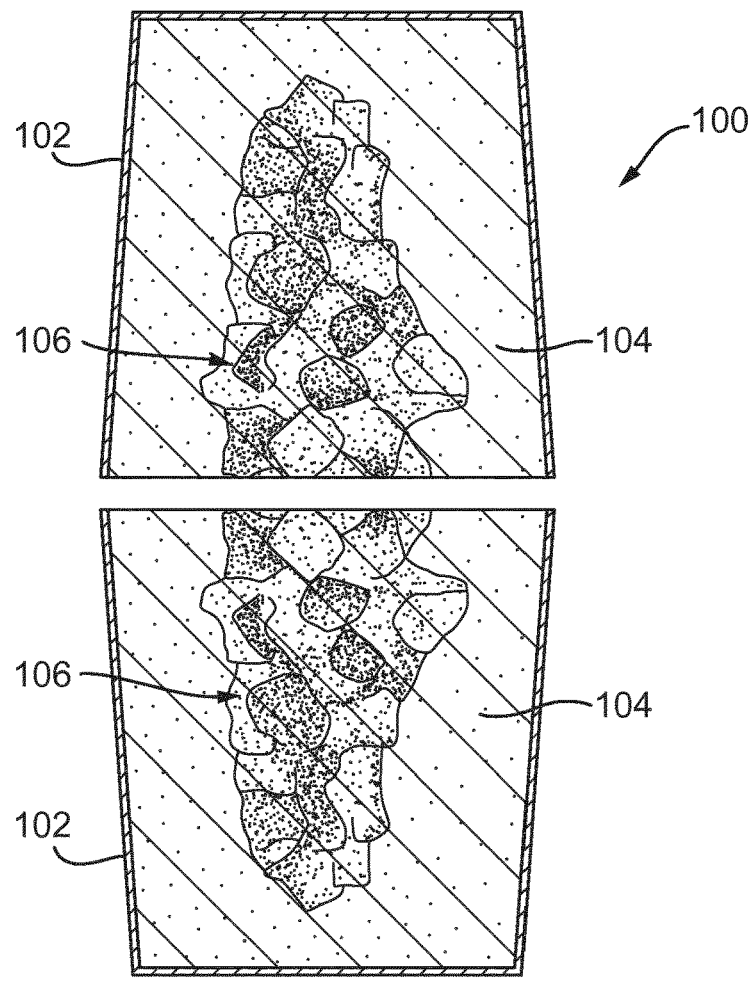
FIG. 2a is a view of a receptacle filled with ice cream and solid inclusions according to the process which has been cut in half to show the internal structure of the product.
Figure 2B:
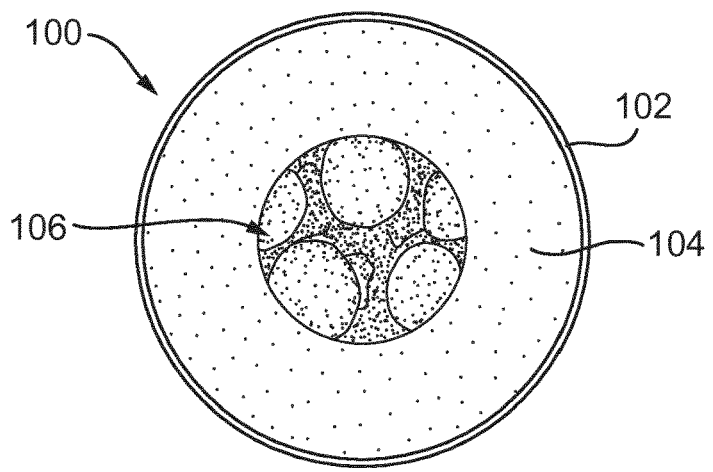
FIG. 2b is a plan view of the receptacle shown in FIG. 2a before it has been cut in half.

FIGS. 2a and 2b show a frozen confection product 100 made according to the apparatus and process of the present invention. The frozen confection product 100 comprises a receptacle 102 containing an ice cream outer region 104 and an inner core of solid inclusions 106. The product was manufactured by simultaneously depositing the ice cream 104 and solid inclusions 106. The ice cream 104 was deposited near the side wall of the open top of the receptacle 102 and the solid inclusions 106 were deposited near the middle of the open top. FIGS. 2a and 2b demonstrate that the majority of solid inclusions are positioned substantially about the vertical axis located in the centre of the receptacle. At least 80%, at least 90%, at least 95% of the solid inclusions are positioned substantially about the vertical axis located in the centre of the receptacle.

Figure 3A:
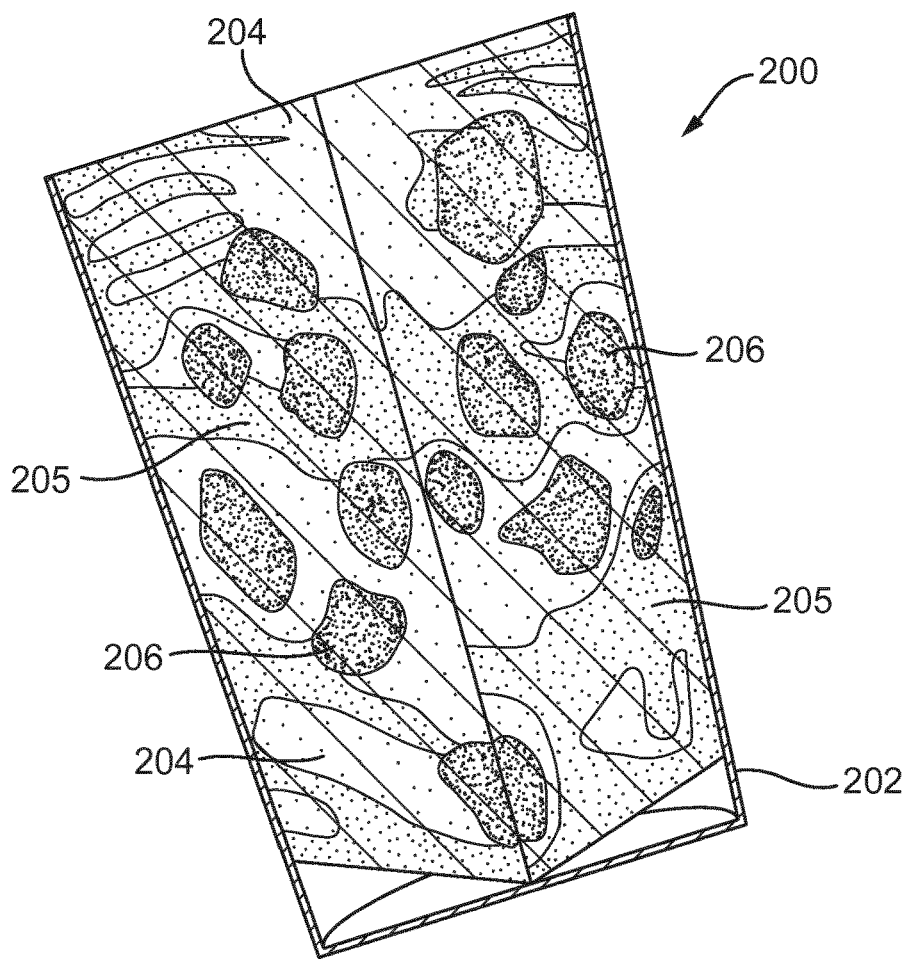
FIG. 3a is a view of a receptacle filled with ice cream and solid inclusions according to the process which has been cut to show the internal structure of the product.
Figure 3B:
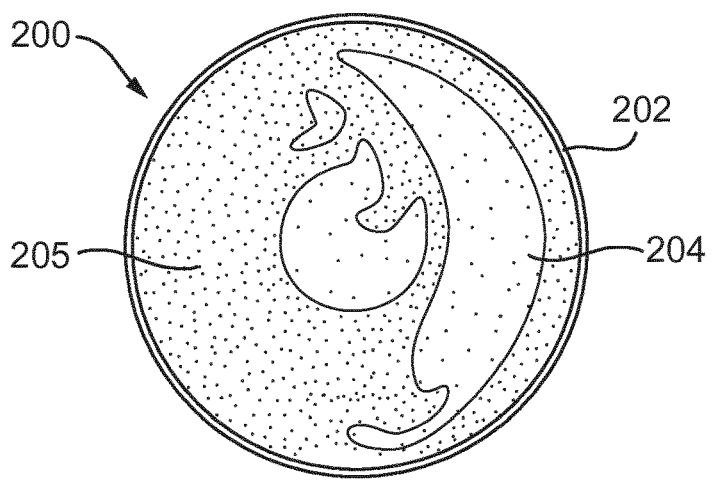
FIG. 3b is a plan view of the receptacle shown in FIG. 3a before it has been cut in half.

FIGS. 3a and 3b show a frozen confection product 200 made according to the apparatus and process of the present invention. The frozen confection product 200 comprises a receptacle 202 containing a blend of two ice creams 204, 205 and solid inclusions 206. The product was manufactured by simultaneously depositing the ice cream 204, 205 and solid inclusions 206. The ice cream 204, 205 was fed near the side of the open top of the receptacle 202 and the solid inclusions 206 were deposited between the middle of the open top and the side of the receptacle to create the result shown. FIGS. 3a and 3b demonstrate an even distribution of solid inclusions throughout the frozen confection within the receptacle. At least 80%, at least 90%, at least 95% of the solid inclusions were distributed evenly throughout the frozen confection within the receptacle.

Alternatively, if the chute 32 is positioned towards the side wall of the receptacle 16; i.e. the solid inclusions are delivered to the receptacle towards the side wall of the receptacle, at least 80%, at least 90%, at least 95% of the solid inclusions are positioned substantially towards the side wall of the receptacle 16.

The phrase 'product obtainable by' is intended to include, but is not limited to products obtained by the process of the invention.

General Experimental Method:

Solid particulate inclusions are dosed at a specified weight and deposited under gravity through a chute into the receptacle as it is being rotated. The average hydraulic diameter, average weight and deviation in average weight of the batch of solid inclusions dosed was calculated for each run.

Example 1

Solid inclusions were cookie pieces (target weight: 10 g; average hydraulic diameter: 12 mm).

Example 2

Solid inclusions were crumble pieces (target weight: 17 g; average hydraulic diameter: 2 mm).

Example 3

Solid inclusions were cookie pieces (target weight: 10 g; average hydraulic diameter: 12 mm). The receptacles were dosed at a rate of 30 receptacles per minute.

Example 4

Solid inclusions were crumble pieces (target weight: 5 g; average hydraulic diameter: 2 mm). The receptacles were dosed at a rate of 30 receptacles per minute.

Example 5

Solid inclusions were cookie pieces (target weight: 10 g; average hydraulic diameter: 12 mm) and crumble pieces (target weight: 5 g; average hydraulic diameter: 2 mm). The receptacles were dosed at a rate of 30 receptacles per minute.

Example 6

Solid inclusions were cookie pieces (target weight: 10 g; average hydraulic diameter: 12 mm) and crumble pieces (target weight: 5 g; average hydraulic diameter: 2 mm). The receptacles were dosed at a rate of 50 receptacles per minute.

TABLE 1

Deviation in weight of batches of solid inclusions per receptacle from the average weight of the batch of solid inclusions per receptacle.

| | | Solid Inclusions | | | | | |
| | | Cookies | | Crumble | | Cookies and Crumble | |
| Ex. | Receptacles filled per minute | Av. (g) | Dev. (g) | Av. (g) | Dev. (g) | Av. (g) | Dev. (g) |
|---|---|---|---|---|---|---|---|
| 1 | | 9.92 | 0.37 | | | | |
| 2 | | | | 17.4 | 0.48 | | |
| 3 | 30 | 10.0 | 0.21 | | | | |
| 4 | 30 | | | 4.77 | 0.25 | | |
| 5 | 30 | | | | | 14.8 | 0.32 |
| 6 | 50 | | | | | 14.62 | 0.33 |

The number of receptacles filled per minute was not measured for Examples 1 and 2; Examples 3, 4 and 5 were filled at a rate of 30 receptacles per minute and Example 4 were filled at a rate of 50 receptacles per minute.

Example 1 shows that the deviation in weight of the batch of solid inclusions from the average weight of the batch of inclusions is 0.37 g. The solid inclusions are cookies and have an average weight of 9.92 g per receptacle. The weight percent deviation of the solid inclusions from the average weight of the inclusions per frozen confection is 3.7 wt %.

Example 2 shows that the deviation in weight of the batch of solid inclusions from the average weight of the batch of inclusions is 0.48 g. The solid inclusions are crumble and have an average weight of 17.4 g per receptacle. The weight percent deviation of the solid inclusions from the average weight of the inclusions per frozen confection is 2.8 wt %.

Example 3 shows that the deviation in weight of the batch of solid inclusions from the average weight of the batch of inclusions is 0.21 g. The solid inclusions are cookies and have an average weight of 10.0 g per receptacle. The weight percent deviation of the solid inclusions from the average weight of the inclusions per frozen confection is 2.1 wt %.

Example 4 shows that the deviation in weight of the batch of solid inclusions from the average weight of the batch of inclusions is 0.25 g. The solid inclusions are crumble and have an average weight of 4.77 g per receptacle. The weight percent deviation of the solid inclusions from the average weight of the inclusions per frozen confection is 2.2 wt %.

Example 5 shows that the deviation in weight of the batch of solid inclusions from the average weight of the batch of inclusions is 0.32 g. The solid inclusions are both cookies and crumble and have an average weight of 14.8 g per receptacle. The weight percent deviation of the inclusions from the average weight of the solid inclusions per frozen confection is 2.2 wt %.

Example 6 shows that the deviation in weight of the batch of solid inclusions from the average weight of the batch of inclusions is 0.33 g. The solid inclusions are both cookies and crumble and have an average weight of 14.62 g per receptacle. The weight percent deviation of the solid inclusions from the average weight of the inclusions per frozen confection is 2.3 wt %.

All examples demonstrate the high accuracy of dosing the solid inclusions per receptacle.

Example 5 illustrates that the at a fill rate of 30 receptacles per minute; i.e. filling the receptacles of a continuous production process in 2 seconds or less, a weight percent deviation of the solid inclusions from the average weight of the inclusions per frozen confection product is 2.2 wt %.

Example 6 illustrates that the at a fill rate of 50 receptacles per minute; i.e. filling the receptacles of a continuous process in 1.2 seconds or less, a weight percent deviation of the solid inclusions from the average weight of the solid inclusions per frozen confection product is 2.3 wt %.

Examples 5 and 6 demonstrate that the process of the present invention is both accurate with regard to the dosing of the receptacle with solid inclusions and capable of accuracy of dosing at high speed of the continuous process.

The invention claimed is:

1. A process for the preparation of a frozen confection product comprising the steps of:
   a. Rotating a receptacle about a substantially vertical axis and depositing a continuous stream of one or more frozen confections into the receptacle;
   b. Depositing into the receptacle a batch of solid inclusions delivered into the receptacle as solids, behaving as a particulate material, in the form of discrete pieces of an edible material or of two or more materials into the receptacle, deposited by separate means from the continuous stream of frozen confection of step a.; and
   c. Cooling the product of step b. to −5 degree C. or lower; wherein, the duration of steps a. to b. is 2.0 seconds or less.

2. The process according to claim 1, wherein step b. occurs during step a.

3. The process according to claim 1, wherein the batch of solid inclusions is delivered to the receptacle by conveyor belt and chute.

4. The process according to claim 1, wherein the batch of solid inclusions are deposited under gravity.

5. The process according to claim 1, wherein the batch of solid inclusions of step b. are cooled or frozen.

6. The process according to claim 1, wherein the batch of solid inclusions have an average hydraulic diameter of from 2 mm to 25 mm.

7. The process according to claim 1, wherein the receptacle is sealed after step c.

8. The process according to claim 1, wherein the receptacle is rotated from 3 to 30 times during steps a. and b.

9. The process according to claim 1, wherein the process is a continuous process wherein at least 30 receptacles are dosed per minute.

10. The process according to claim 1, wherein 95% or greater of the batch of solid inclusions are deposited in substantially the centre of the receptacle comprising the frozen confection.

11. The process according to claim 1, wherein 95% or greater of the batch of solid inclusions are deposited between the centre and the edge of the receptacle comprising the frozen confection.

12. The process according to claim 1, wherein 95% or greater of the batch of solid inclusions are deposited substantially at the edge of the receptacle comprising the frozen confection.

13. The process according to claim 1, wherein 90% or greater of the frozen confection products have a percentage deviation by weight from the mean weight of the batch of solid inclusions of frozen confection products of from 0% to 10%.

* * * * *